(12) United States Patent
Choe

(10) Patent No.: US 7,730,558 B2
(45) Date of Patent: Jun. 8, 2010

(54) TREATMENT APPARATUS FOR EXCREMENT OF REST ROOM

(75) Inventor: Chon-u Choe, Seoul (KR)

(73) Assignee: Mirae Industrial Systems Co., Ltd. (KR)

( * ) Notice: Subject to any disclaimer, the term of this patent is extended or adjusted under 35 U.S.C. 154(b) by 991 days.

(21) Appl. No.: 11/491,391

(22) Filed: Jul. 21, 2006

(65) Prior Publication Data
US 2007/0124853 A1    Jun. 7, 2007

(30) Foreign Application Priority Data
Dec. 2, 2005  (KR) .................. 10-2005-0117013

(51) Int. Cl.
*A47K 11/02* (2006.01)
(52) U.S. Cl. ........................................ 4/111.1
(58) Field of Classification Search ........ 4/111.1–111.6
See application file for complete search history.

(56) References Cited

U.S. PATENT DOCUMENTS 5,257,466 A * 11/1993 Kishi ............................ 34/95
5,598,641 A * 2/1997 Kishi ............................ 34/247
6,496,988 B1 * 12/2002 Hammond .................... 4/317

FOREIGN PATENT DOCUMENTS

KR   10-0458291   11/2004

* cited by examiner

*Primary Examiner*—Huyen Le
(74) *Attorney, Agent, or Firm*—Cantor Colburn LLP

(57) ABSTRACT

Disclosed herein is a treatment apparatus for excrement of a rest room wherein sludge is able to be separated and incinerated via a simplified process without a vacuum drying of excrement that is transferred from a storage tank, whereby continuous treatment of excrement is possible, resulting in an increase in excrement treatment efficiency and capacity while achieving a reduction in maintenance costs. Also, in the present invention, water contained in excrement is able to be purified with a high efficiency, whereby the purified water can be reused as wash water of a toilet or directly drained without a separate post-treatment.

5 Claims, 5 Drawing Sheets

TREATMENT APPARATUS FOR EXCREMENT OF REST ROOM

BACKGROUND OF THE INVENTION

1. Field of the Invention

The present invention relates to a treatment apparatus for excrement of a rest room, and more particularly, to an excrement treatment apparatus for use in a rest room, which is installed at tourist destinations, camping areas, parking places, parks, outdoor cafeterias, devastated districts, and other public sites, to achieve continuous treatment of excrement as well as a great increase in treatment capacity, and in particular, to achieve a reduction of maintenance costs.

2. Description of the Related Art

Generally, public sites, such as for example, tourist destinations, camping areas, parking places, parks, outdoor cafeterias, devastated districts, and other sites, are mainly installed with a simple rest room. Such a simple rest room is easy for installation and movement, and in particular, is convenient to install at sites where a great amount of people are periodically concentrated. For this reason, the installation rate of the simple rest room is gradually increasing. The simple rest room includes a toilet and a storage tank mounted beneath the toilet for storing human waste-excrement and urine. Herein, for the sake of easy explanation, human waste is simply referred to as excrement. In use, if the excrement fills the storage tank beyond a predetermined level, the excrement is extracted from the storage tank by use of an excrement collection vehicle, and is transferred to a certain excrement disposal plant or landfill site.

However, the conventional simple rest room as stated above has several problems in that it has a bad smell due to the excrement in the storage tank and allows inhabitation of harmful insects, such as flies, which are a cause of various diseases. Therefore, it can be said that the sanitary condition of the simple rest room is causing great anxiety. Furthermore, some sites, where the excrement collection vehicle has difficulty accessing, suffer from a difficulty in disposal of the excrement in the storage tank. Also, the excrement extracted from the storage tank must be secondarily treated, and therefore, this results in an extra economical burden.

To solve the above described problems, various technologies for developing a simple rest room, which has its own excrement treatment facilities, have been studied. As an example of the related prior art technologies, the applicant of the present invention filed Korean Patent Application No. 0458291, which is entitled "NIGHT-SOIL TREATMENT APPARATUS". The prior art technology disclosed in the above Korean Patent Application proposes that a lavatory is converted into a flushing toilet, excrement filled in an excrement storage tank is periodically vacuum dried and incinerated, and a rest room is provided with a deodorization function, in order to achieve a remarkable improvement in sanitary conditions of the rest room.

Now, the prior art technology of Korean Patent Application No. 0458291, which was filled and registered by the applicant of the present invention, will be explained in detail with reference to the accompanying drawing, in particular, with reference to FIG. 5.

Referring to FIG. 5, the prior art treatment apparatus for excrement of a rest room comprises: a storage tank 120 to receive and store excrement that falls down directly from a toilet 110 and to discharge the excrement by use of a submergible pump 121 after the excrement fills the storage tank 120 beyond a predetermined level; a recovery tank 125 having a pump 126 to supply wash water to the toilet 110; a vacuum furnace 130 to dry the excrement transferred from the storage tank 120 and to incinerate the dried excrement; an air tank 140 to discharge ashes in the vacuum furnace 130 to the outside along with air; a bug-filter 150 to filter the ashes discharged along with the air; a collection vessel 152 to receive the ashes captured by the bug-filter 150; a vacuum pump 160 to suck bad-smell gas and water contained in the excrement that is introduced into the vacuum furnace; a primary cooler 161 and a secondary cooler 162 to cool the bad-smell gas and water sucked by the vacuum pump 160; a reverse osmosis separation membrane member 190, through which the cooled water, having passed through the secondary cooler 162, passes, so as to transfer purified water into the recovery tank 125, non-purified water being adapted to repeatedly pass through the reverse osmosis separation membrane member 190; and a deodorizer 170 to remove the bad-smell gas, having passed through the secondary cooler 162, so as to discharge only purified gas to the outside.

In operation of the prior art excrement treatment apparatus having the above described configuration, excrement in the toilet 110 falls down directly to the storage tank 120 in accordance with the operation of an opening/closing lever 111 formed at the toilet 110. If the excrement fills the storage tank 120 beyond a predetermined level, the submergible pump 121 operates to transfer the excrement to the vacuum furnace 130. If the excrement is transferred into the vacuum furnace 130, the bad-smell gas and water contained in the excrement is first sucked by the vacuum pump 160, enabling the excrement to be dried. Then, the dried excrement is pulverized by a ball mill 135, and is incinerated in accordance with the operation of a heater 132. After completion of incineration, high-pressure air stored in the air tank 140 is injected into the vacuum furnace 130 via a plurality of nozzles 142, to transfer the ashes, which are remained after incineration, to the bug-filter 150. Thereby, the ashes are filtered by the bug-filter 150, such that the ashes captured by the bug-filter 150 are received in the collection vessel 152. To filter fine ashes that are too small to be captured by the bug-filter 150, a cyclone 151 is located downstream of the bug-filter 150. Accordingly, the fine ashes, having passed through the bug-filter 150, are able to be captured by the cyclone 151, so as to be transferred into and received in the collection vessel 152 along with the ashes captured by the bug-filter 150. Meanwhile, the bad-smell gas and water, which are sucked by the vacuum pump 160, are cooled while passing through the primary cooler 161 and the secondary cooler 162 in sequence. The resulting cooled water is able to be purified by passing through the reverse osmosis separation membrane member 190. Thereby, the purified water is transferred into the recovery tank 125, and the remaining non-purified water is adapted to repeatedly pass through the reverse osmosis separation membrane member 190. Also, the bad-smell gas, having passed through the secondary cooler 162, is transferred to the deodorizer 170, so as to be purified while passing through the deodorizer 170. As a result, only purified gas is discharged to the outside.

Through the above described operation, the prior art excrement treatment apparatus decomposes excrement of a rest room, more particularly, portable rest room, and deodorizes bad-smell of the rest room, achieving a remarkable improvement in sanitary conditions of the rest room. Furthermore, with the prior art excrement treatment apparatus, the recycling of wash water used and water contained in the excrement is possible, and therefore, a reduction in amount of water used is accomplished. In particular, the prior art excrement treatment apparatus enables effective treatment of excrement that is a main cause of environmental contamination, thereby contributing significantly to the purification of environment. In addition, since the ashes, which are generated by the incineration process using the vacuum furnace 130, are adapted to be captured by the bug-filter 150 and cyclone 151 via the injection of air, the disposal of ashes is simplified and also, disposal efficiency of the ashes is improved.

In spite of the above described several advantages, however, the prior art excrement treatment apparatus is insufficient due to the following problems. Firstly, in the case of the prior art excrement treatment apparatus, if a certain amount of excrement is transferred to the vacuum furnace 130, bad-smell gas and water contained in the excrement are first removed, causing the excrement to be dried, and after that, the dried excrement is carbonized. This vacuum drying and carbonization processes prevent continuous treatment of excrement, and therefore, result in a limit in excrement treatment capacity. Furthermore, the vacuum drying and carbonizing processes performed in the vacuum furnace disadvantageously increase an excrement treatment time while reducing an excrement treatment capacity, resulting in an increase in maintenance costs.

SUMMARY OF THE INVENTION

Therefore, the present invention has been made in view of the above problems, and it is an object of the present invention to provide a treatment apparatus for excrement of a rest room wherein sludge is able to be separated and incinerated via a simplified process without a vacuum drying of excrement that is transferred from a storage tank, whereby continuous treatment of excrement is possible, resulting in an increase in excrement treatment efficiency and capacity while achieving a reduction in maintenance costs.

It is another object of the present invention to provide a treatment apparatus for excrement of a rest room wherein water contained in excrement is able to be purified with a high efficiency, whereby the purified water can be reused as wash water of a toilet or directly drained without a separate post-treatment.

BRIEF DESCRIPTION OF THE DRAWINGS

The above and other objects, features and other advantages of the present invention will be more clearly understood from the following detailed description taken in conjunction with the accompanying drawings, in which.

DESCRIPTION OF THE PREFERRED EMBODIMENTS

Hereinafter, a treatment apparatus for excrement of a rest room in accordance with the present invention will be explained in detail. The excrement treatment apparatus in accordance with the present invention is characterized in that it comprises an electro-coagulation and flotation device for separating sludge of excrement, which is transferred from a toilet into a storage tank, from water (i.e. water contained in the excrement and wash water used). The separated sludge is transferred to a carbonization treatment, so as to be carbonized and again transferred to a collection vessel. Also, the water is transferred to a recovery tank to be stored therein.

With the excrement treatment apparatus having the above described characteristic, the sludge is able to be separated and carbonized via a simplified manner without a vacuum drying of excrement transferred from the storage tank. This enables a continuous treatment of excrement, resulting in an increased treatment capacity while achieving a reduction of maintenance costs.

Furthermore, in the excrement treatment apparatus in accordance with the present invention, the water, which is primarily processed by the electro-coagulation and flotation device and stored in a processed water reservoir of the electro-coagulation and flotation device, is adapted to pass through a filter member just prior to being transferred to the recovery tank, so as to be secondarily purified.

Such a secondary purification of water using the filter member has the effect of achieving high purification efficiency. The resulting purified water may be stored in the recovery tank to be recycled as wash water of the toilet, or may be directly drained without a risk of environmental pollution.

The above described characteristic of the present invention will be more clearly understood from the following description. Now, preferred embodiments of the present invention will explained in more detail.

Figure 1:
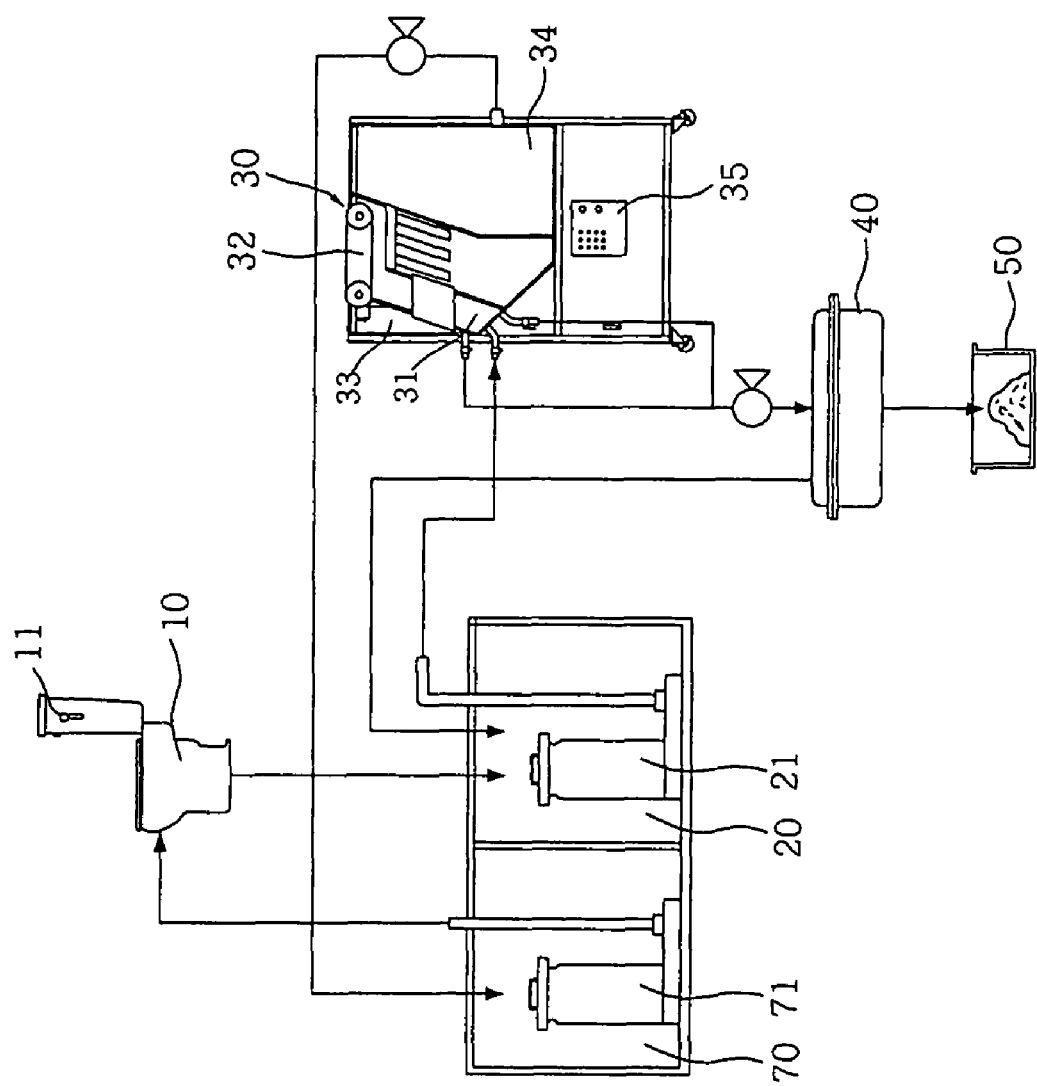
FIG. 1 is a diagram schematically illustrating a treatment apparatus for excrement of a rest room in accordance with a first embodiment of the present invention.
Figure 2:
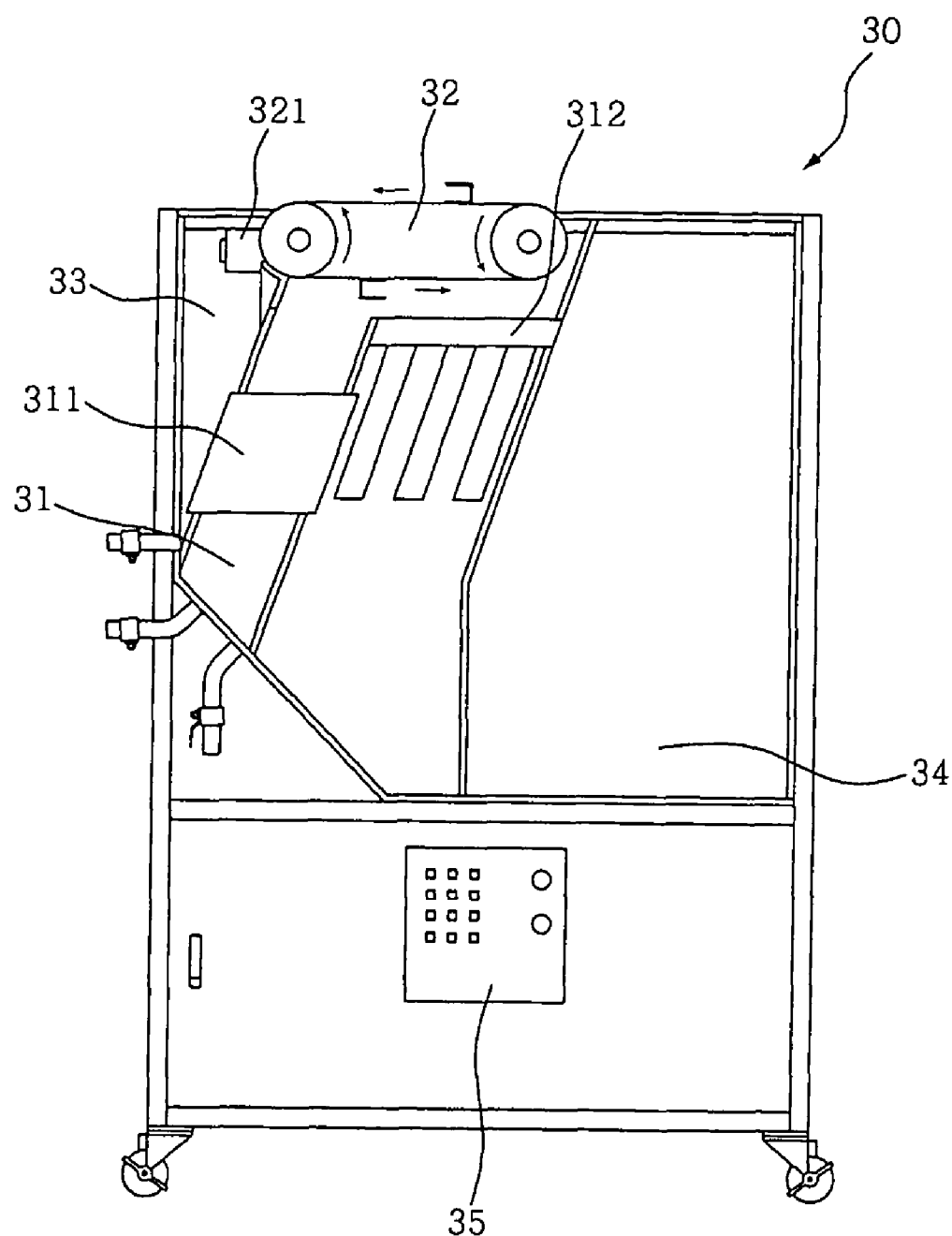
FIG. 2 is an enlarged view illustrating the important part of the excrement treatment apparatus of FIG. 1.

FIG. 1 is a diagram schematically illustrating a treatment apparatus for excrement of a rest room in accordance with a first embodiment of the present invention. FIG. 2 is an enlarged view illustrating the important part of the excrement treatment apparatus of FIG. 1.

As shown in FIGS. 1 and 2, the treatment apparatus for excrement of a rest room comprises: a storage tank 20 to store excrement that falls down directly from a toilet 10 of the rest room; an electro-coagulation and flotation device 30; a carbonization chamber 40; a collection vessel 50; and a recovery tank 70. Here, the electro-coagulation and flotation device 30 includes: a reactor 31 having an electrode plate 311 to apply electric current to the excrement transferred from the storage tank 20, so as to produce coagulated matter, i.e. sludge; a scraper 32 provided at an upper end of the reactor 31 to scrape the sludge when the sludge rises up; a sludge reservoir 33 to store sludge transferred by the scraper 32; a processed water reservoir 34 to store water processed in and transferred from the reactor 31; and a control box 35 to control the generation operation of the electro-coagulation and flotation device 30. The carbonization chamber 40, which contains a heater therein, serves to carbonize the sludge, which is transferred from the sludge reservoir 33 of the electro-coagulation and flotation device 30. During the carbonization of the sludge, water is produced in the carbonization chamber 40, and is returned to the storage tank 20. The collection vessel 50 is used to receive ashes generated from the carbonization chamber 40. The recovery tank 70 is used to store the processed water, transferred from the processed water reservoir 34 of the electro-coagulation and flotation device 30.

As known, the toilet 10 is provided with an opening/closing lever 11. In accordance with the operation of the opening/closing lever 11, excrement in the toilet 10 falls down directly to the storage tank 20, to thereby be stored therein.

The excrement in the storage tank 20 is transferred to the electro-coagulation and flotation device 30 to be treated therein. The transfer of excrement is able to be performed by use of known transfer means including a transfer pump 21. The transfer pump 21 may be mounted inside the storage tank 20 as shown in FIG. 2, or may be mounted at the outside of the storage tank 20. Also, if necessary, an agitator (not shown) may be selectively mounted at the storage tank 20 for the sake of easy discharge of excrement.

The electro-coagulation and flotation device 30 of the present invention is a known device including positive and negative electrodes. If direct current is applied to the positive and negative electrodes in water treatment, metal ions are eluted from the positive electrode, and hydrogen gas is generated from the negative electrode. Thereby, through interaction between the metal ions and hydrogen gas, electro-coagulation, electro-flotation, and electro-oxidation reactions are able to be obtained. These reaction mechanism has the effect of achieving stabilization and coagulation of pollutants, such as suspended particulate matter, emulsion particulate matter, and insoluble particulate matter contained in a water medium. As a result, the electro-coagulation and flotation device is able to separate the coagulated matter, i.e. sludge, from the processed water, and to discharge the processed water. Nowadays, the electro-coagulation and flotation device is widely used in the field of water treatment.

In operation of the electro-coagulation and flotation device 30, the electric current applied to the water medium acts as an electro-catalyst for causing a chemical reaction, and the metal ions produce a hydroxide when they are molten in the water medium. The produced metallic hydroxide has high coagulation and absorption properties due to a strong activity thereof. Also, active oxygen generated from the positive electrode has the function of oxidizing organic matter under water, and destroying bacteria or virus. These hydrogen and oxygen generated from the negative and positive electrodes form fine air bubbles, and are combined with flocks, i.e. sludge that are byproducts of the coagulation reaction to be raised upward. In this way, the sludge is able to be separated.

The present invention intends to achieve high excrement treatment efficiency through the best use of the electro-coagulation and flotation device 30 having the above described characteristics. As stated above, the electro-coagulation and flotation device 30 includes: the reactor 31 having the electrode plate 311 to apply electric current to excrement transferred from the storage tank 20, so as to produce coagulated matter; the scraper 32 provided at the upper end of the reactor 31 to scrape the coagulated matter; the sludge reservoir 33 to store the sludge transferred by the scraper 32; the processed water reservoir 34 to store the water processed in and transferred from the reactor 31; and the control box 35 to control the operation of the electro-coagulation and flotation device 30.

Specifically, the reactor 31 is provided with the electrode plate 311 to apply electric current to excrement introduced thereinto, and the operation of the electrode plate 311 is controlled by the control box 35 that is located beneath the electrode plate 311. Accordingly, if the excrement, transferred from the storage tank 20, is introduced into the reactor 31, electric current is applied to the electrode plate 311, causing pollutants, contained in the excrement, to be coagulated and raised. The raised coagulated matter is transferred to the sludge reservoir 33 by the scraper 32. In this case, although a part of the coagulated matter is deposited on the bottom of the reactor 31, the deposit is also transferred to the carbonization chamber 40 along with the sludge stored in the sludge reservoir 33 as will be described hereinafter. The scraper 32, provided to remove the raised coagulated matter, is a device that is usually used in the known electro-coagulation and flotation device 30. As shown in FIG. 2, the scraper 32 is adapted to rotate in a predetermined direction in accordance with the driving of a motor 321, so as to transfer the raised coagulated matter the sludge reservoir 33. The water, processed in the reactor 31, is transferred to the processed water reservoir 34 through a transfer pipe 312 that is provided in the reactor 31, to thereby be stored in the processed water reservoir 34. In the present invention, the transfer pipe 312 is fabricated to have a T-shaped form since the T-shaped form is advantageous to transfer the processed water, which is introduced upward into the transfer pipe 312 from a lower end thereof, to the processed water reservoir 34. The control box 35, which serves to control the general operation of the electro-coagulation and flotation device 30, is able to be easily mounted by use of known technologies.

Meanwhile, the sludge, stored in the sludge reservoir 33, is transferred to the carbonization chamber 40 along with the deposit in the reactor 31. In this case, the transfer of sludge is performed by use of a pump P, and other various transfer means may be also added as occasion demands. The carbonization chamber 40 contains a heater (not shown) therein to carbonize the transferred sludge. To achieve effective carbonization of the sludge, it is desirable that the heater be designed to generate heat having a temperature of 400 to 600° C. When the sludge is carbonized in the carbonization chamber 40, water is produced in the carbonization chamber 40, and is returned to the storage tank 20. Ashes generated in the carbonization chamber 40 are transferred to the collection vessel 50 to be stored therein.

The processed water, stored in the processed water reservoir 34 of the electro-coagulation and flotation device 30, is transferred to and stored in the recovery tank 70. The transfer of the processed water may be performed by use of a pump P, and other various transfer means may be also added as occasion demands. The processed water, transferred to the recovery tank 70, is sufficiently clean so as to be recycled as wash water of the toilet 10. To recycle the processed water as the wash water of the toilet 10, a transfer pump 71 may be mounted in the recovery tank 70.

Preferably, the recovery tank 70 is located under the bottom of a rest room along with the storage tank 20. This arrangement ensures excrement to fall down directly to the storage tank in a simplified manner, and the processed clean water to be easily supplied from the recovery tank 70 to the toilet 10 so as to be used as wash water.

As stated above, the treatment apparatus for excrement of a rest room in accordance with the present invention employs the electro-coagulation and flotation 30, differently from the prior art wherein excrement, transferred from the storage tank, is subjected to vacuum drying and carbonization processes in sequence in the vacuum furnace. Through the use of the electro-coagulation and flotation 30, sludge is able to be separated via a simplified process without a vacuum drying process, and in succession, the sludge is able to be carbonized in the carbonization chamber 40. This enables a continuous treatment of excrement, and therefore, an increased excrement treatment capacity and reduced maintenance costs can be accomplished.

Figure 3:
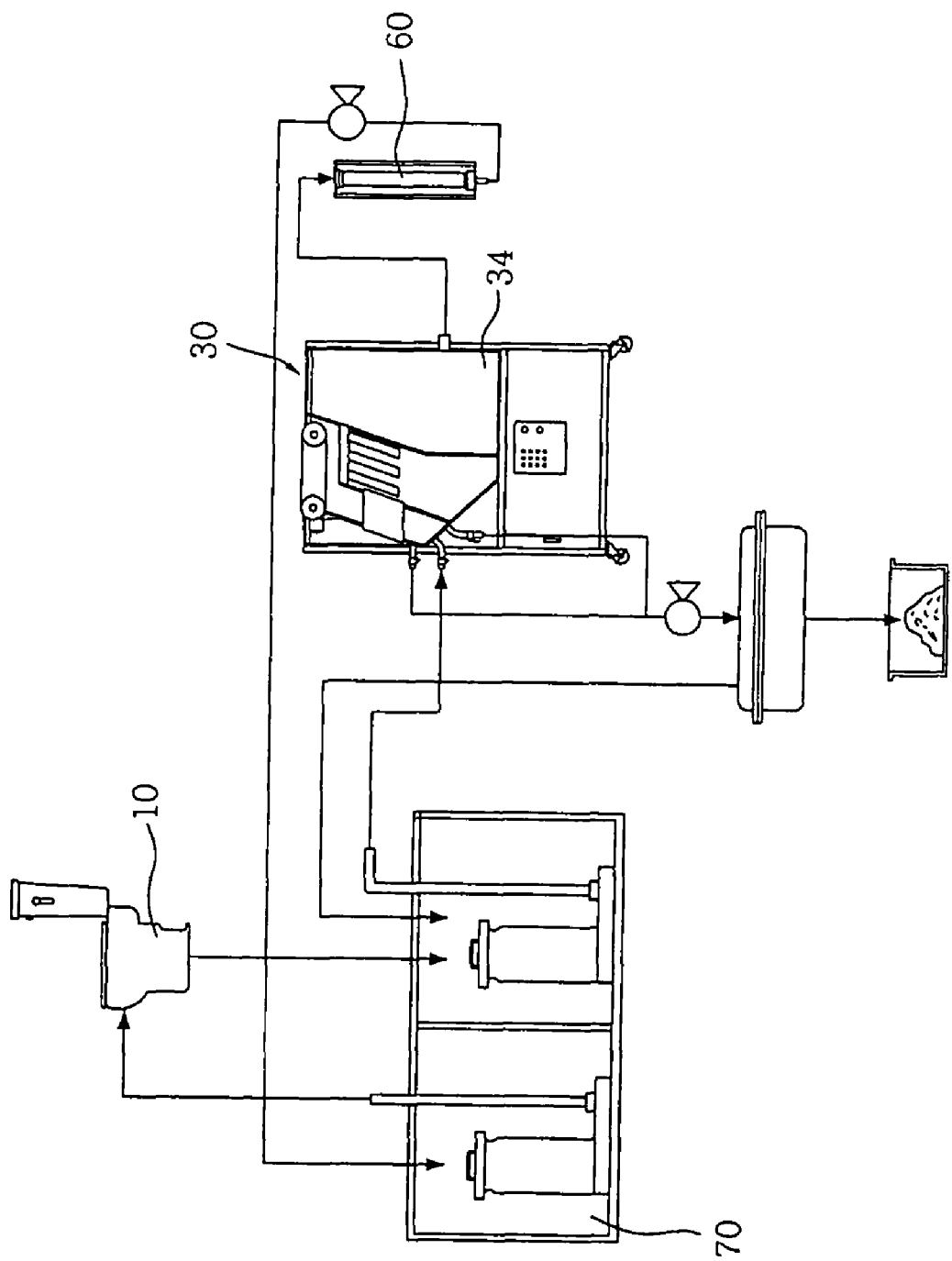
FIG. 3 is a diagram schematically illustrating a treatment apparatus for excrement of a rest room in accordance with a second embodiment of the present invention.

FIG. 3 is a diagram schematically illustrating a treatment apparatus for excrement of a rest room in accordance with a second embodiment of the present invention.

As shown in FIG. 3, the treatment apparatus for excrement of a rest room in accordance with the second embodiment of the present invention further comprises a filter member 60 for secondarily purifying the processed water. In the present embodiment, the filter member 60 is located after the electro-coagulation and flotation device 30 and before the recovery tank 70, such that the processed water is purified by passing through the filter member 60 when it is transferred from the processed water reservoir 34 of the electro-coagulation and flotation device 30 to the recovery tank 70.

In this way, the processed water, discharged from the water reservoir 34 of the electro-coagulation and flotation device 30, is able to be purified with high efficiency by passing through the filter member 60, prior to being transferred to the recovery tank 70. With the high efficiency purification of water contained in the excrement, the purified water stored in the recovery tank 70 is able to be recycled as wash water of the toilet 10. Also, even when the water is directly drained without a separate post treatment process, there is no risk of environmental pollution.

Preferably, the filter member 60 may be one selected from a nano-filter, micro-filter, or ultra-filter. Of course, if necessary, other various known filter members may be added thereto. More preferably, the filter member 60 may be the micro-filter in the view of maintenance costs and treatment efficiency.

Figure 4:
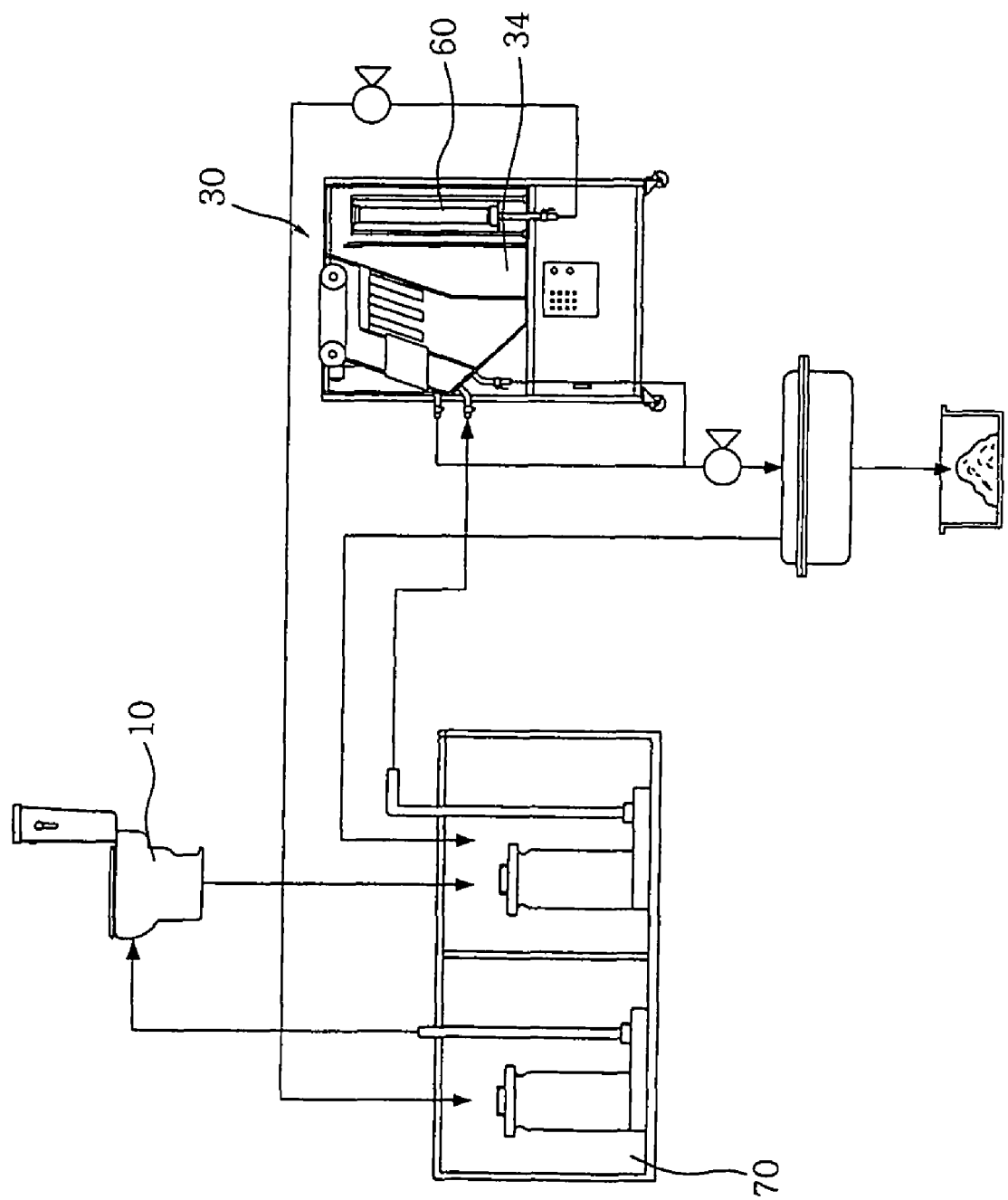
FIG. 4 is a diagram schematically illustrating a treatment apparatus for excrement of a rest room in accordance with a third embodiment of the present invention.
Figure 5:
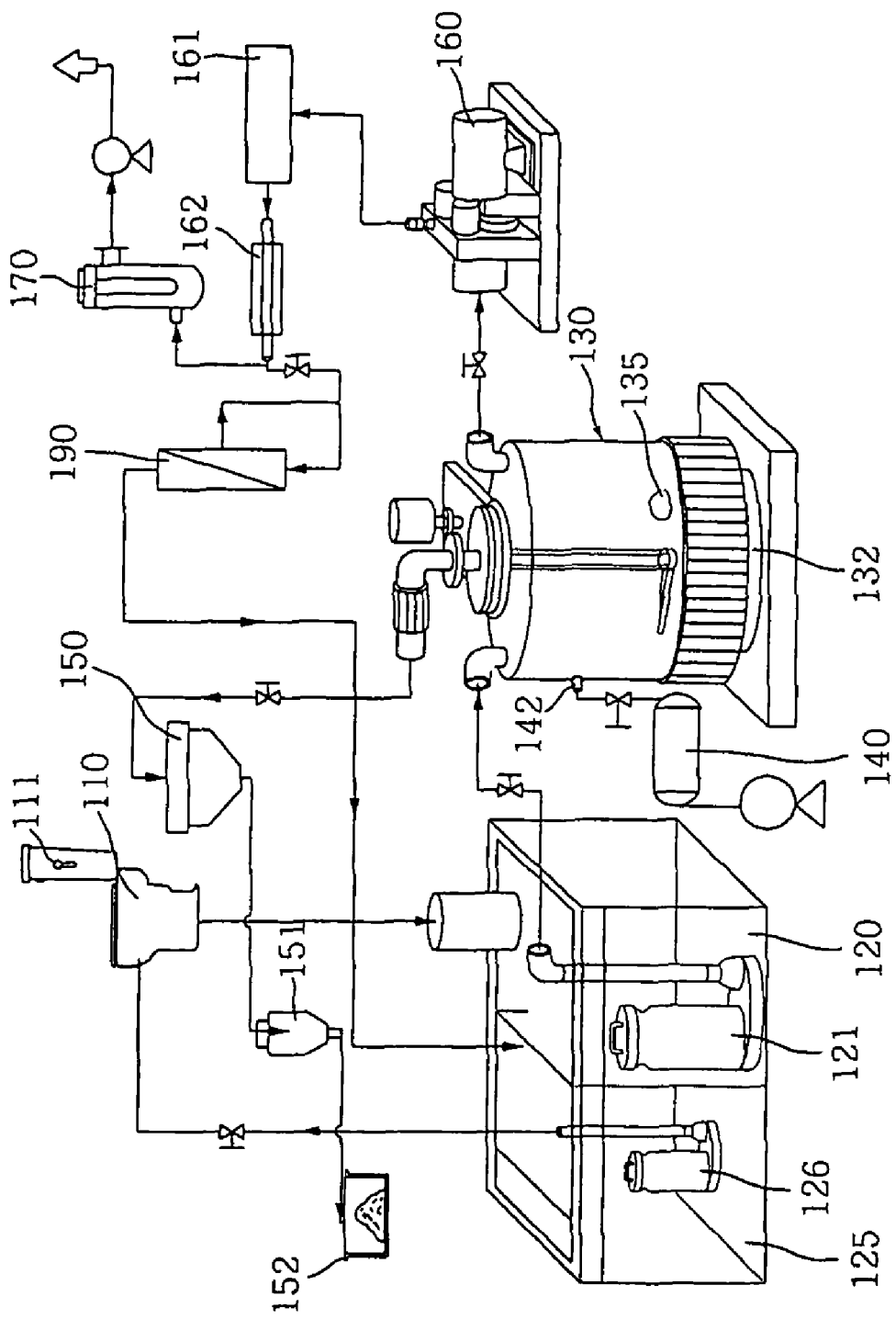
FIG. 5 is a diagram schematically illustrating a treatment apparatus for excrement of a rest room in accordance with the prior art.

FIG. 4 is a diagram schematically illustrating a treatment apparatus for excrement of a rest room in accordance with a third embodiment of the present invention.

As shown in FIG. 4, the filter member 60 may be vertically mounted in the processed water reservoir 34 of the electro-coagulation and flotation device 30 at a position near an inner wall surface of the device 30. With this configuration, when the processed water, stored in the processed water reservoir 34, flows upward, the water passes through the filter member 60 to thereby be purified. Then, the purified water is transferred to the recovery tank 70. Mounting the filter member 60 inside the electro-coagulation and flotation device 30 has the effect of achieving a reduction in the overall installation volume of the excrement treatment apparatus.

As apparent from the above description, the present invention provides a treatment apparatus for excrement of a rest room having the following effects.

Firstly, in accordance with the present invention, sludge is able to be separated via a simplified manner by use of an electro-coagulation and flotation device without a vacuum drying process, and to be carbonized in sequence. As a result, a continuous treatment of excrement is possible, and therefore, an increased excrement treatment capacity and reduced maintenance costs can be accomplished.

Secondarily, in the treatment apparatus for excrement of a rest room, more particularly, a portable rest room in accordance with the present invention, water contained in excrement is primarily processed via the electro-coagulation and flotation device, and in succession, is secondarily processed via a filter member, so as to achieve high purification efficiency. Accordingly, the purified water is able to be recycled as wash water of a toilet, or to be directly drained without a risk of environmental pollution.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A treatment apparatus for excrement of a rest room comprising:
   a storage tank to store excrement that falls down directly from a toilet of the rest room;
   an electro-coagulation and flotation device including;
      a reactor having an electrode plate to apply electric current to the excrement transferred from the storage tank, so as to produce coagulated matter, i.e. sludge;
      a scraper provided at an upper end of the reactor to scrape the sludge when the sludge rises up;
      a sludge reservoir to store sludge transferred by the scraper;
      a processed water reservoir to store water processed in and transferred from the reactor; and
      a control box to control the generation operation of the electro-coagulation and flotation device;
   a carbonization chamber containing a heater therein to carbonize the sludge, which is transferred from the sludge reservoir of the electro-coagulation and flotation device, during the carbonization of the sludge, water being produced in the carbonization chamber and be returned to the storage tank;
   a collection vessel to receive ashes generated from the carbonization chamber; and
   a recovery tank for receiving the processed water transferred from the processed water reservoir of the electro-coagulation.

2. The apparatus as set forth in claim 1, further comprising:
   a filter member for purifying the processed water when the water passes therethrough while being transferred from the processed water reservoir of the electro-coagulation and flotation device to the recovery tank.

3. The apparatus as set forth in claim 2, wherein the filter member is mounted in the processed water reservoir of the electro-coagulation and flotation device at a position near an inner wall surface of the reservoir, to purify the processed water when the processed water, stored in the processed water reservoir, passes threrethrough while flowing upward, the resulting purified water being transferred to the recovery tank.

4. The apparatus as set forth in claim 3, wherein the filter member is one selected from among a nano-filter, micro-filter, and ultra-filter.

5. The apparatus as set forth in claim 2, wherein the filter member is one selected from among a nano-filter, micro-filter, and ultra-filter.

* * * * *